US007011725B2

(12) United States Patent
Geller et al.

(10) Patent No.: US 7,011,725 B2
(45) Date of Patent: Mar. 14, 2006

(54) HIGH PERFORMANCE EMBEDDED RF FILTERS

(75) Inventors: Bernard Dov Geller, Princeton, NJ (US); Aly Eid Fathy, Langhorne, PA (US); Michael James Liberatore, Lawrenceville, NJ (US); Attiganal Narayanswamy Sreeram, Edison, NJ (US); Barry Jay Thaler, Lawrenceville, NJ (US)

(73) Assignee: Lamina Ceramics, Inc., Westampton, NJ (US)

( * ) Notice: Subject to any disclaimer, the term of this patent is extended or adjusted under 35 U.S.C. 154(b) by 0 days.

(21) Appl. No.: 11/135,764

(22) Filed: May 24, 2005

(65) Prior Publication Data

US 2005/0217786 A1 Oct. 6, 2005

Related U.S. Application Data

(62) Division of application No. 09/430,642, filed on Oct. 29, 1999, now Pat. No. 6,914,501.

(60) Provisional application No. 60/106,313, filed on Oct. 30, 1998.

(51) Int. Cl.
*B32B 31/26* (2006.01)
*C03B 29/00* (2006.01)
*H01P 1/207* (2006.01)

(52) U.S. Cl. .............................. 156/89.17; 156/89.12; 156/89.16; 156/252; 156/253; 333/208

(58) Field of Classification Search ............. 156/89.12, 156/89.16, 89.17
See application file for complete search history.

(56) References Cited

U.S. PATENT DOCUMENTS

| | | | | |
|---|---|---|---|---|
| 5,329,687 | A | 7/1994 | Scott et al. | 29/527.2 |
| 5,382,931 | A | 1/1995 | Piloto et al. | 333/208 |
| 5,621,365 | A | 4/1997 | Yamazaki et al. | 333/204 |
| 5,621,366 | A | 4/1997 | Gu et al. | 333/204 |
| 5,731,751 | A | 3/1998 | Vangala | 333/212 |
| 5,772,820 | A * | 6/1998 | Schoch et al. | 156/89.12 |
| 5,830,301 | A * | 11/1998 | Sturzebecher et al. | 156/89.16 |
| 5,876,539 | A * | 3/1999 | Bailey et al. | 156/89.16 |
| 5,894,252 | A | 4/1999 | Oida | 333/202 |
| 6,020,800 | A | 2/2000 | Arakawa et al. | 333/208 |
| 6,137,384 | A | 10/2000 | Kubota et al. | 333/219.1 |
| 6,350,335 | B1 * | 2/2002 | Hampel et al. | 156/89.14 |

OTHER PUBLICATIONS

Gipprich et al., "Embedded Waveguide Filters For Microwave and Wireless Applications Using Cofired Ceramic Technologies," Internatl. J. of Microcircuits and Electronic Packaging, vol. 21, No. 3, 3rd Quarter, pp. 279-283 (1998).

* cited by examiner

*Primary Examiner*—Melvin Mayes
(74) *Attorney, Agent, or Firm*—Lowenstein Sandler, PC

(57) ABSTRACT

Embedded, coupled, shaped waveguide resonators having conductive walls sandwiched between two fired green tape stacks, said conductive walls having apertures therein whose size and location determine the degree of coupling. These waveguides are made by forming openings in a first green tape stack, defining walls and apertures therein, mounting a second green tape stack having a conductive layer thereon thereover and firing the assembly. E-plane probes are inserted in openings in the second green tape stack and connected to microstrip transmission lines on an external surface pf this green tape stack.

3 Claims, 1 Drawing Sheet

HIGH PERFORMANCE EMBEDDED RF FILTERS

CROSS-REFERENCE TO RELATED APPLICATIONS

This application is a divisional of U.S. patent application Ser. No. 09/430,642 filed on Oct. 29, 1999, now U.S. Pat. No. 6,914,501, which claims the benefit of U.S. Provisional application Ser. No. 60/106,313, filed Oct. 30, 1998. The entire disclosures of U.S. patent application Ser. No. 09/430,642 and U.S. Provisional Application No. 60/106,313 are hereby incorporated herein by reference.

GOVERNMENT SUPPORT

This invention was at least partially supported by the Government Contract No. F33615-96-2-5105. The government may have certain rights in this invention.

FIELD OF THE INVENTION

This invention relates to embedded RF filters. More particularly, this invention relates to multilayer ceramic printed circuit boards including embedded RF filters having high performance.

BACKGROUND OF THE INVENTION

Low temperature firing multilayer ceramic circuit boards are known that are suitable for use with low melt temperature conductive metals, such as silver, gold and copper. They have a low thermal coefficient of expansion (TCE) and they may be formulated to be compatible with both silicon and gallium arsenide devices.

These ceramic circuit boards are made from glasses that can be fired at low temperatures, e.g., temperatures of less than 1000° C. The circuit boards are made by admixing finely divided selected glass particles or powders and optional inorganic fillers, with organic materials including resin, solvents, dispersants and the like. The resultant slurry is cast as a thin tape, called green tape. A circuit pattern may be screen printed onto the green tape using a conductor ink formulation comprising a conductive metal powder, an organic vehicle and a powdered glass, generally the same glass as that used to make the green tape.

A plurality of green tapes having printed circuits thereon can be stacked together. In such case, via holes are punched into the green tapes which are filled with a conductive via fill ink to provide electrical contact between the circuits on the various green tapes. The green tapes are then aligned, laminated under heat and pressure, and fired to remove the organic materials and to vitrify the glass.

Recently, multilayer ceramic circuit boards have been adhered to a metal support board for added mechanical strength. A bonding glass can be used to coat the metal support and to provide adhesion between the support and the laminated ceramic layers. An added advantage to this method is that the bonding glass reduces shrinkage of the green tapes in the x and y dimensions during firing. Thus most of the shrinkage occurs in the z, or thickness, dimension. The result is that tolerances between the circuits and the via holes can be reduced. The glasses used to make the green tapes must have a TCE matched to that of the metal support to prevent delamination or cracking of the fired glass. The TCE of the green tapes can be modified by use of various metal oxide glass precursors and various inorganic fillers.

Still more recently, various passive components, such as resistors and capacitors, have been incorporated into this ceramic circuit board system. Discrete components initially were mounted on the fired green tape stack, and wire bonded to circuitry placed about the edges of the circuit board. Presently components such as resistors and capacitors are being printed on green tape layers where they become embedded in and part of the circuit board after firing.

Such systems can be used with RF and microwave components, particularly in the fields of personal communication, wherein manufacturers wish to produce devices, among them hand held devices, that are small, light in weight, more reliable and less expensive than conventional devices. One of the critical components of such systems are the provision of RF filters which are required to define and separate RF frequency bands at radio and microwave frequencies with minimum loss and maximum selectivity. Presently such RF filters are made as discrete, surface mounted components, e.g., edge-coupled stripline resonators, which are expensive. Further, they take up valuable board space that could be given over to incorporation of additional functions on the board, or to reduce the overall size and weight of the ceramic circuit board.

Embedded RF filters including strip conductors in a ceramic circuit board stack have been tried, but the performance results are no more than marginal for insertion loss and selectivity.

Thus a method of forming and embedding RF filters in a green tape stack, that can be fired without loss of performance, has been sought.

SUMMARY OF THE INVENTION

Coupled shaped waveguide resonators having conducting walls are formed and embedded in a ceramic circuit board. These waveguide resonators have high Q values, and, by adjusting the size of the cavities and the permittivity of the ceramic, the desired operating frequency can be obtained. Coupling between cavities can be obtained by making apertures in the sidewalls of the cavities having a predetermined size and location that determine the degree of coupling.

The embedded waveguide resonators are made by forming three dimensional, shaped, e.g., rectangular or cylindrical, structures, the boundaries of which are conductive, in a green tape stack. Coupling into and out of these structures can be accomplished using E-plane probes which protrude through an opening in a top and bottom wall of the green tape stack and are connected on the external side to a microstrip or other printed transmission line. The waveguide resonators are embedded between green tapes and fired.

DETAILED DESCRIPTION OF THE INVENTION

The embedded RF filters of the invention comprise a plurality of dielectric filled waveguide resonators having dimensions defined by conductors on the top, bottom and sidewalls. These volumes can have various sizes and shapes, depending on the operating frequency and resonant mode desired. The cavities are coupled together by means of apertures formed in the interior walls. The position and size of these apertures can also be adjusted depending on the degree of coupling desired.

Figure 1:
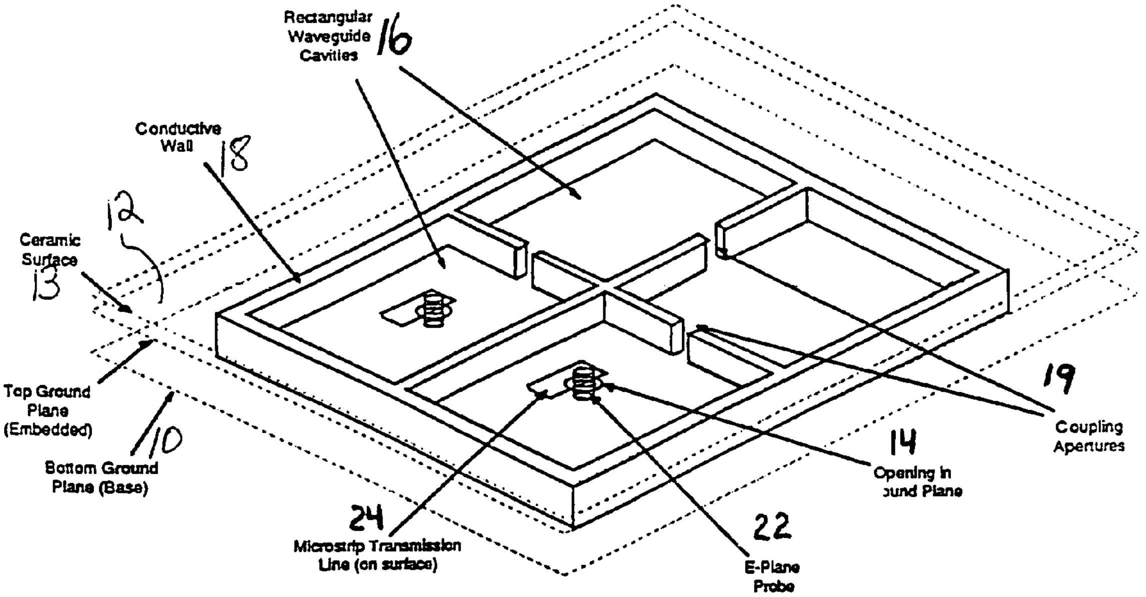
FIG. 1 is a perspective view of a portion of an embedded RF filter of the invention.
Figure 2:
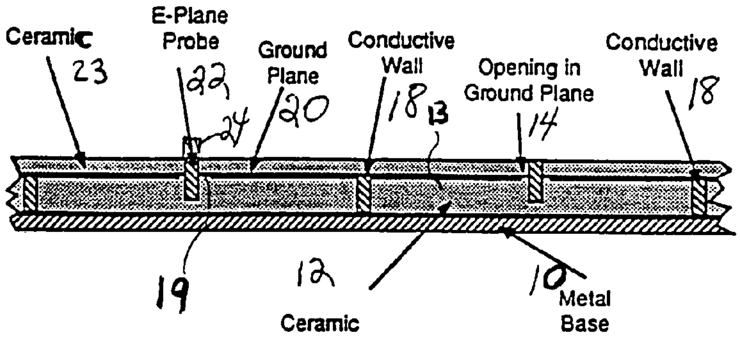
FIG. 2 is a cross sectional view of the structure of the invention.

FIG. 1 illustrates an embedded RF filter that can be made according to the present invention. FIG. 2 is a cross sectional view thereof.

Referring to FIGS. 1 and 2, metal support or ground plane 10 has a first green tape stack 12 mounted thereon having a surface 13. This green tape stack 12 is punched to provide openings for cavity walls 18 and coupling apertures 19, forming cavities 15, and openings 14 for insertion therein of E-plane probes 22. The cavity walls 18 and coupling apertures 19 are printed with a metal conductor ink to make the walls and openings 18, 19 of the cavities conductive. A conductive layer 20 can be printed over the first green tape stack 12 to form a second ground plane.

A second green tape or green tape stack 23 (FIG. 2) is mounted over the ground plane 20. Alternatively, the bottom surface of the second green tape or green tape stack 23 is screen printed with a conductive layer to form the second ground plane 20. Openings 14 are punched therein to provide for insertion of E-plane probes 22. A microstrip transmission line 24 can be screen printed onto the top surface of the second green tape 23 over the openings 14. The first and second green tape layers 12, 23 are aligned, laminated and fired to form an embedded filter assembly.

Thus the embedded RF filter of the invention is made by coupling waveguide resonators formed within a ceramic substrate.

Green tapes can be made with low, moderate or high dielectric constant materials, depending on the operating frequency desired.

The metal support base 10 can be made of Kovar®, an alloy of 53.8% by weight of iron, 29% by weight of nickel, 17% by weight of cobalt and 0.2% by weight of manganese, supplied by Carpenter Technology; titanium; or a Cu—Mo—Cu laminate. The latter base is preferred for its high thermal conductivity. If the metal base 10 is coated with a dielectric, such as a bonding glass, a conductive layer forming the ground plane 10 can be printed onto the dielectric layer.

A low dielectric constant green tape is made by combining two glasses. A first crystallizing glass can be a Mg—Al-borosilicate glass. A suitable glass is made by combining 136.0 grams (34% by weight) of MgO, 52 grams (13% by weight) of alumina, 200.0 grams (50% by weight) of silica and 12 grams (3% by weight) of boron oxide.

The oxide powders were melted together at 1660° C. for one half hour, and quenched. The glass was then ground.

A second crystallizing glass is suitably made from a system of oxides of Mg—Al—P—B—Si. One suitable glass is prepared by mixing 124.0 grams (31% by weight) of MgO, 80 grams (20% by weight) of alumina, 188.0 grams of silica, 4.0 grams (1% by weight) of boron oxide and 4.0 grams (1% by weight) of phosphorus pentoxide. This glass was melted at 1650° C., then quenched and ground. Optionally an inorganic filler such as cordierite can also be added. The glasses are admixed with a binder and solvent to form a slurry which was cast as a green tape.

The green tape can be made by mixing 8 grams of the first glass described above, 190.0 grams of the second glass, 2.0 grams of cordierite, 43.0 grams of a first solution containing 846 grams of methyl ethyl ketone, 846 grams of ethanol and 112.5 grams of Menhaden fish oil, and 54.0 grams of a second solution containing 620 grams of methyl ethyl ketone, 620 grams of ethanol, 192 grams of plasticizer # 160 of Monsanto Corp. and 288 grams of B-98 resin, also from Monsanto Corp.

Moderate dielectric constant (50–100) green tapes can be made by admixing 25–75% by weight of titanium dioxide into the above glass mixture. High dielectric constant (>3000) green tapes can be made from about 90% by weight of lead magnesium niobate (PMN) mixed with about 10% by weight of lead oxide flux and similar organic binders.

The chosen slurry is cast to form green tape. Via holes are punched in the green tape, and circuitry applied by screen printing conductor inks. The via holes are filled by screen printing a conductive via fill ink. A plurality of green tapes are then aligned to provide a green tape stack and laminated using heat and pressure in known manner. The green tape stack 12 is then punched to form openings for the walls 18, apertures 19 and openings 14 for insertion of E-plane probes 22. Microstrip transmission lines 24 are applied to the surface to connect to the E-plane probes 22.

A metallization ink is then used to apply a conductive layer onto the cavity bottom and to form conductive sidewalls 18 and apertures 19. A suitable silver metal conductor ink can be made by mixing 18 grams (64.6%) of silver powder, available as SPQ from Degussa Corp, 7.5 grams (16.1%) of silver flake, also from Degussa Corp, 1.50 grams (5.4%) of a resin made by dissolving 12 weight % of ethyl cellulose having a molecular weight of 300 in a mixed solvent of 50% butyl carbitol and 40% dodecanol, 3 grams of resin made by dissolving 4 weight % of ethyl cellulose having a molecular weight of 14 in the same mixed solvent, 0.45 gram (1.6%) OF Hypermer PS2 from ICI Surfactants, 0.20 gram (0.7%) of n-butyl phthalate from Fisher Chemical and 0.45 grams (1.6%) of a 50:50 lecithin-terpineol 318 solvent available from Hercules Corp.

A second green tape stack 23 (see FIG. 2) having the bottom layer 24 screen printed with a metal conductor ink to form a second ground plane 20 was aligned and laminated to the first green tape stack.

The resultant structure was fired at a peak temperature below 1000° C.

The resultant embedded RF filters have improved performance at lower cost than surface mounted RF filters, and they are smaller and lighter in weight than surface mounted RF filters. They are eminently suitable for hand held and other communication devices.

Although the invention has been described in terms of particular glasses and conductors, the invention is not meant to be so limited. The glasses of the various green tapes can be the same or different. Some green tapes can be made of low dielectric constant glasses, and others from mid to high dielectric constant materials.

Although the sidewalls of the resonators are shown as solid walls, they can also be made of metal vias to provide "picket fence posts" placed close enough together so that their spacing does not provide coupling, except for the desired coupling apertures which are spaced more widely apart.

The invention is thus only to be limited by the scope of the appended claims.

We claim:

1. A method of making embedded, coupled, shaped waveguide resonators having conductive walls sandwiched between fired green tape stacks comprising:

mounting a first green tape stack on a metal base support substrate;

punching openings in said green tape stack to form cavity walls and coupling apertures;

forming conductive metal layers over the openings and walls;

mounting a second green tape stack over the conductive metal layers with a conductive ground plane layer therebetween, said second green tape having openings therein for insertion of E-plane probes;

screen printing microstrip transmission lines on the top surface of the second green tape stack so as to connect them with the inserted E-plane probes;

aligning the green tape stacks; and firing the resultant assembly to vitrify the glasses in the green tapes.

2. The method according to claim 1 wherein the green tapes are made from two crystallizing glasses of a Mg—Al-Silicate type, and an organic vehicle.

3. The method according to claim 1 wherein forming the conductive metal layers comprises using conductive ink including silver powder and silver flake and an organic vehicle.

* * * * *